United States Patent [19]

Hudson

[11] Patent Number: 5,377,224
[45] Date of Patent: Dec. 27, 1994

[54] ACQUISITION OF FREQUENCY BURSTS IN PCN

[75] Inventor: John E. Hudson, Essex, United Kingdom

[73] Assignee: Northern Telecom Limited, Montreal, Canada

[21] Appl. No.: 133,448

[22] Filed: Oct. 7, 1993

[51] Int. Cl.$^5$ ............................................. H04K 1/10
[52] U.S. Cl. ......................................................... 375/1
[58] Field of Search ............................................. 375/1

[56] References Cited

U.S. PATENT DOCUMENTS

| | | | |
|---|---|---|---|
| 4,554,669 | 11/1985 | Deman et al. | 375/1 |
| 4,763,103 | 8/1988 | Galula et al. | 375/1 |
| 5,136,613 | 8/1992 | Dumestre | 375/1 |

Primary Examiner—David C. Cain
Attorney, Agent, or Firm—Lee, Mann, Smith, McWilliams, Sweeney & Ohlson

[57] ABSTRACT

A method of acquiring frequency bursts in a PCN broadcast control channel, including the steps of:
  i) sampling PCN r.f. signals for successive blocks of time of duration of half the duration of a frequency burst;
  ii) determining the first block to have a spectrum level to exceed a threshold value,
  iii) comparing the spectrum levels of said first block and an adjacent block during successive occurrences of the frequency burst; and
  iv) adjusting the timing of the two blocks until the spectrum levels of the two blocks are substantially equal.

3 Claims, 4 Drawing Sheets

ACQUISITION OF FREQUENCY BURSTS IN PCN

BACKGROUND OF THE INVENTION

This invention relates to a method and means for acquiring frequency bursts in a personal communications network (PCN) handset when the PCN handset is first switched on.

When a PCN handset is first switched on the local oscillator (LO) in the receiver is required to have an accuracy ±10 ppm or ±20 Hz which is sufficient to get the broadcast control channel into the IF bandwidth but not accurate enough to allow the channel estimator to work, so the Viterbi algorithm is inoperative and digital data is inaccessible. The VA requires an accuracy of the order of 100 Hz or ±0.05 ppm so that there is insignificant phase shift at the ends of the data bursts relative to the centre where phase is corrected by the channel estimator. Thus the very first task of the handset is to receive frequency correction bursts on the control channel in order to correct the LO frequency such that the receiver can become fully functional and receive control data relating to frequency and time-slot allocations.

The organisation of the GSM (Global Systems Mobile) frequency correction bursts is shown in FIG. 1. The broadcast control bursts are split up and multiplexed to modulate the first burst of consecutive frames on the broadcast channel frequency. The control channel contains one "F" burst in every ten. Frames are eight bursts long and last for 4.615 ms, this means that one burst in 80 is a frequency burst at regular intervals of 46.15 ms.

The broadcast channel frequency used is fixed for each base station, however the timing of the frequency used is fixed for each known at the start when the handset is switched on from cold. If the handset has been carried to a new base station area without active handoff, even the broadcast frequency may be unknown.

The sequence of events for acquisition of the base station is:
  (i) Detect the presence and timing of the frequency bursts (also the actual choice of broadcast channel in the worst case).
  (ii) Correct the local oscillator in the handset using one or more F bursts.
  (iii) Run the channel equaliser to find accurate burst and bit timing.
  (iv) Run the Viterbi algorithm to demodulate the synchronisation bursts to find frequency allocations etc.

There is little choice over the form of the detector for the correction bursts which must be a matched filter and the two alternative hypotheses which the detector evaluates are the presence of random data and the presence of correction burst. The detection problem is a classical one except that the noise against which the correction burst must be compared is not white noise but spectrally-coloured data.

The presence of gaps between carrier bursts as an aid to burst location cannot be assumed since these may be filled in multipath conditions.

Ignoring the colouration of the random data, which can easily be reduced by digital filtering, the mechanisation of the matched filter could take two forms:
  (i) Digital filters: a bank or perhaps 100 IIR digital filters, each tuned to a specific offset in the ±20 k Hz range and having a bandwidth of 200 Hz. The rise times of these filters, 1/B, would be more or less consistent with the duration of the burst (0.525 ms) and they would operate in an integrate-and-dump mode. The work load for each filter, assuming single complex poles, would be 142 complex multiplication and additions per burst making a total of 14,200 fixed point complex operations for the whole burst.
  (ii) Fast Fourier Transforms (FFTs): Here, if a 128-point DFT were used, the work load would be about $128 Log_2(128)$ * 896 fixed point complex operations.

As the FFT approach is numerically much more efficient the invention will be described with relevance to this approach.

SUMMARY OF THE INVENTION

According to the invention there is provided a method of acquiring frequency bursts in a PCN broadcast control channel including the steps of:
  i) sampling PCN r.f. signals for successive blocks of time of duration of half the duration of a frequency burst;
  ii) determining the first block to have a spectrum level to exceed a threshold value,
  iii) comparing the spectrum levels of said first block and an adjacent block during successive occurrences of the frequency burst; and
  iv) adjusting the timing of the two blocks until the spectrum levels of the two blocks are substantially equal.

In a preferred embodiment of the invention there is provided a method of acquiring frequency bursts in a GSM broadcast channel, including the steps of:
  i) sampling a group of channels having different known frequencies for successive blocks of time of a duration of half the duration of a frequency burst;
  ii) performing a digital discrete Fourier transform (DFT) filter operation on the signal samples in each block;
  iii) comparing the peak spectrum level of each DFT filtered sample with a predetermined threshold value to determine the first block to have a spectrum level to exceed the threshold value;
  iv) comparing the spectrum levels of said first block and an adjacent block repetitively, substantially on successive occurrences of the frequency burst, to derive a differential of the spectrum levels;
  v) generating an error signal representing the differential of the spectrum levels; and
  vi) applying said error signal in a feedback loop to adjust the sampling times of said first and adjacent blocks to drive the differential of the spectrum levels to zero.

BRIEF DESCRIPTION OF THE DRAWINGS

Embodiments of the invention will now be described with reference to the accompanying drawings, in which.

DESCRIPTION OF PREFERRED EMBODIMENTS

Finding the frequency bursts is a two dimensional time-frequency problem very similar to a pulse-Doppler radar one. Simulations of DFT's applied to a unit amplitude GMSK randomly modulated carrier $x_n$ show that in a 128-point transform applied to once per bit samples:

$$F_m = \sum_0^{127} x_n \exp(-j2\pi nm/128) \qquad (1)$$

$|F_{MAX}|^2$ commonly reaches levels of 3000-4000 as against around 150 for unit variance white noise while if a correction burst is present instead of the random data then, for perfect alignment of the carrier frequency with a DFT bin frequency, a level of $128^2=16348$ should be achieved which would appear to give a reasonable margin for detection of around 6 dB. Note that data and frequency bursts will have the same power on the broadcast channel.

However two factors degrade this result, The first is that the carrier frequency may lie midway between two DFT bins, appearing with a 4 dB loss in each. The second is that if the carrier sampling is started at a random time there will be some time misalignment of the correction burst with the samples and the FFT will be of part frequency burst and part random data. If the samples are stepped along in increments of 128, the smallest number of burst samples (out of a 142 sample burst) would be 72 which would give rise to a medullas square level of $72^2=5784$ which looks much less promising, being not much greater than the levels found for purely random data. If this misalignment is combined with the frequency error then the result could be a squared medullas of only 2063 which is totally ineffective; the greatest DFT-bin output would actually decrease during the frequency burst. Clearly some protection against such errors is required.

Figure 1:
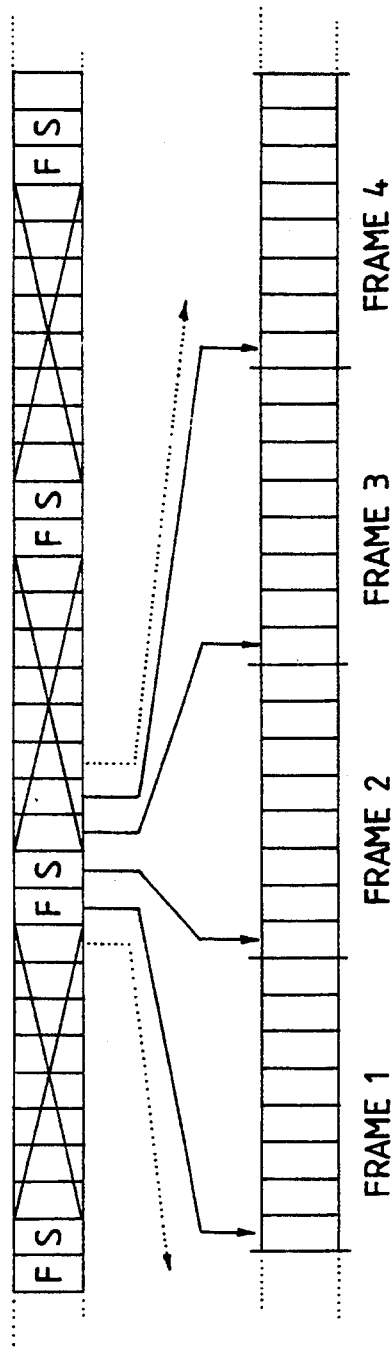
FIG. 1 illustrates the organisation of the frequency correction bursts in a GSM broadcast control channel, (already described)
Figure 2:
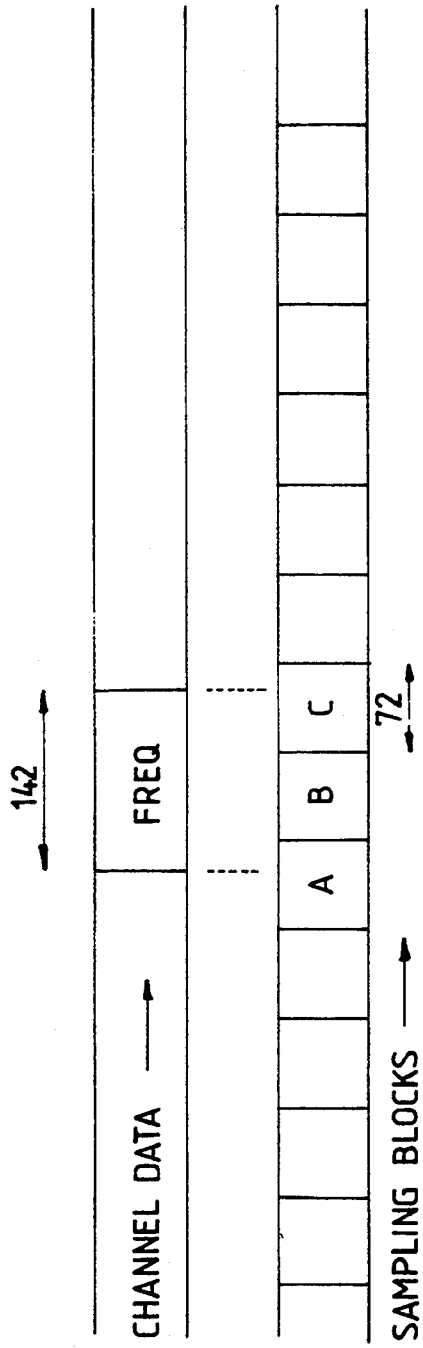
FIG. 2 illustrates coarse acquisition of a frequency correction burst.

Time misalignment is perhaps the most serious, giving rise to a 6 dB loss and it would be better to shift the sampling blocks in smaller increments. After some experimentation it has been found that using blocks of half the burst length, 72 bits, and shifting in increments of 72 bits has certain advantages. This block structure is shown in FIG. 2 and it guarantees that one block will lie wholly within the correction burst, will contain no random data and, as discussed below, this will give the basis of the most reliable test for the presence of the frequency burst. If the blocks are made longer than 72 bits and are non-overlapping then it becomes less likely that one block is free of random data unless the shifting increments are less than the block length. For example blocks of 142 points could be moved along in steps of only one sample and blocks of 128 points in steps of 64. This would render the FFT's, more numerous on average and the computation load would actually be greater than the 72 point option.

In FIG. 2 the burst is coarsely located by comparing the block peak spectrum level (i.e. the frequency bin with greatest power in each block) to a threshold. The starting point of the first block to exceed it is taken as is first estimate of the start of the burst. In the Figure, if block B passed the threshold, then the start of block B would be so taken.

The channel samples can be reduced in number by simple multirate digital filtering as follows. Since the frequency offset is known to lie in the range ±20 k for 10 ppm accuracy, the channel data is oversampled at the 270 Kbit/sec rate, especially at two samples per bit. It would be feasible to take the samples in triples at one sample per bit rate or sextuples at twice per bit rate, add them serially, and regroup the original 142 (or 248) into 47 samples. This is equivalent to forming an FIR digital filter with transfer function $$H(z) = 1 + z^{-1} + z^{-2} \qquad (2)$$

when clocked at the channel sampling rate, with frequency response.

$$H(jw) = 1 + e^{-jwt} + e^{-2jwt}$$

and $$|H|^2 = \sin(1.50)/\sin(0.50) \qquad (3)$$

where $0 - wT$ and $1/T$ = original sampling rate (270 kB/s).

This digital filter will low-pass filter the base band data, reduce white noise and, when the output is resampled at ⅓ input rate, will decorrelate the GMSK random data to some extent, but most importantly will reduce the number of points required in the DFT. If the 142/3 47 data points are padded out to 64 an FFT can be used and cusping of the DFT frequency responses is reduced.

Having found a frequency burst by the coarse direct search technique above it remains to locate the burst accurately since if the start of sampling of the frequency burst is in error the inclusion of random data at one end or the other will reduce the accuracy of the frequency estimator. The latter is designed to operate at 10 dB SNR minimum for channel noise, and a further loss in accuracy would result from the inclusion of 14 random data points. Thus it is advisable to drop samples whose authenticity as frequency correction points is questionable.

A conflicting effect is that the limiting accuracy of the frequency estimator is proportional to the cube of the number of sample points (see below). If 7 points are lost from 142 then frequency estimation variance increases by 6.7%. Therefore it is necessary to compromise between the possibility of including bad data and the diminishing accuracy as N is reduced.

As the three guard bits included in the channel frame at each end of the frequency burst are all zeros, the same as the frequency burst bits, then in principle there are actually 142+6=148 bit lengths, however the leading guard bits may be corrupted by multipath and only the trailing ones could be used.

The course search procedure above has the property that the first block to pass the threshold, or the subsequent one, will lie entirely within the frequency burst, so these two blocks are used to initialise the fine search algorithm.

Figure 3:
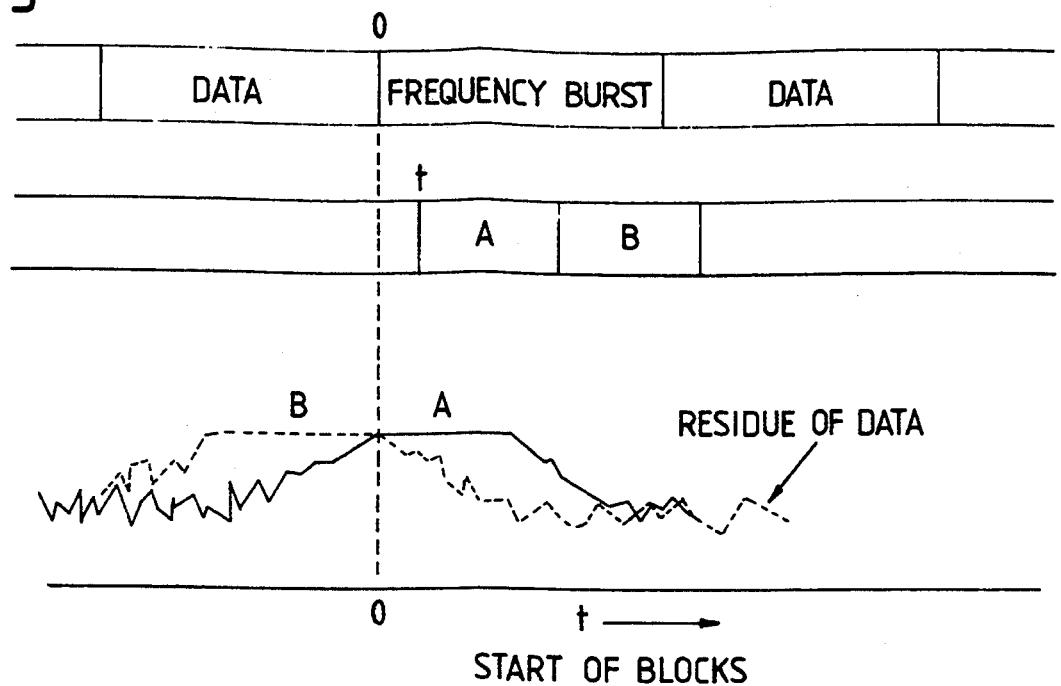
FIG. 3 illustrates fine timing adjustment of the sampling of the frequency correction burst.

Referring to FIG. 3, fine timing will be done by comparing the spectrum amplitudes of two consecutive blocks. With the frequency burst starting at time zero, the blocks are initially located as position "t" such that the offset of the start of the first block is t units after the start of the frequency burst. The two curves below show the expected variation of FFT medullas at the peak frequency. If a block lies entirely within the correction burst its normalised spectrum peak will equate to the maximum with some accuracy while if it strays outside then its levels fall to about half (as an empirical observation) and the values become rather random. The aim is to adjust the sampling time such that t=0 and both blocks have their maximum value. If block B is smaller than block A then the blocks have started late and are moved to the left and vice-versa. The amount of shift is computed so as to get to the exact position in one step if the random baseline is ignored.

This dual peak finding is a little unusual for a phase-lock loop since normally it would try to operate on the slopes of the responses where the gradient is greatest and the loop most sensitive to timing error. However the randomness of the spectrum levels increases rapidly as the operating point moves down the slopes due to the inclusion of random data and it is better to avoid these regions. Riding the peak levels of both sample blocks has the effect that very accurate estimates of misalignment are obtained for small misalignments of a few samples and timing accuracy of around one bit is quite possible. The random side slopes are only used if the timing error is very large.

When the radio channel is subject to fading as would occur if the handset were in a moving vehicle, it is likely that there will be a significant difference of carrier levels between occurrences of the frequency bursts and this would reduce the accuracy of the phaser-lock loop operation if the two samples were taken from different occurrences of the frequency burst. To prevent this the FFT arrangement of FIG. 7 should be operated in such a way that both burst samples arise from the same frequency burst. The required modifications are very simple and would involve feeding 97 samples into the serial-in-parallel-out buffer and taking two 47 length blocks out into the two FFTs, one from the front end and one from the back.

The IF levels in the receiver are not necessarily known to great accuracy and the levels of each block must be normalised. One way to normalise the spectrum is to hard limit the medullas of the input samples. For 142 samples this would fix the peak possible spectrum value at 142 for example. However the peak value of the Fourier transform in (1) is modified by the filtering correction (3) and it would be preferable to limit the medullas of the filtered and resampled data, giving a peak spectrum of 47.

Less arithmetic is done if the 2-norm of the sequence is used a measure. If X is an input vector of 47 points and F(w) is a column of a DFT matrix (N=64).

$$F_n(w) = \exp(-jwn/N), n=0,\ldots,46 \quad (4)$$

then the spectrum level is given by $$f(w) = F^T X$$

and since the Schwarz inequality shows that $$|F^T X|^2 \leq X^T X \, F^T F \quad (5)$$

then $$|f(w)|^2 47 |X^T X|^2 = 47|x_n|^2. \quad (6)$$

so the peak spectrum level can be accurately predicted. The presence of any random data bits in the block will invariably reduce the spectrum level. When the input data is padded out with zeros to increase the number of points from 47 to 64 this has no effect on the peak spectrum level and the equations above remain valid.

Figure 4:
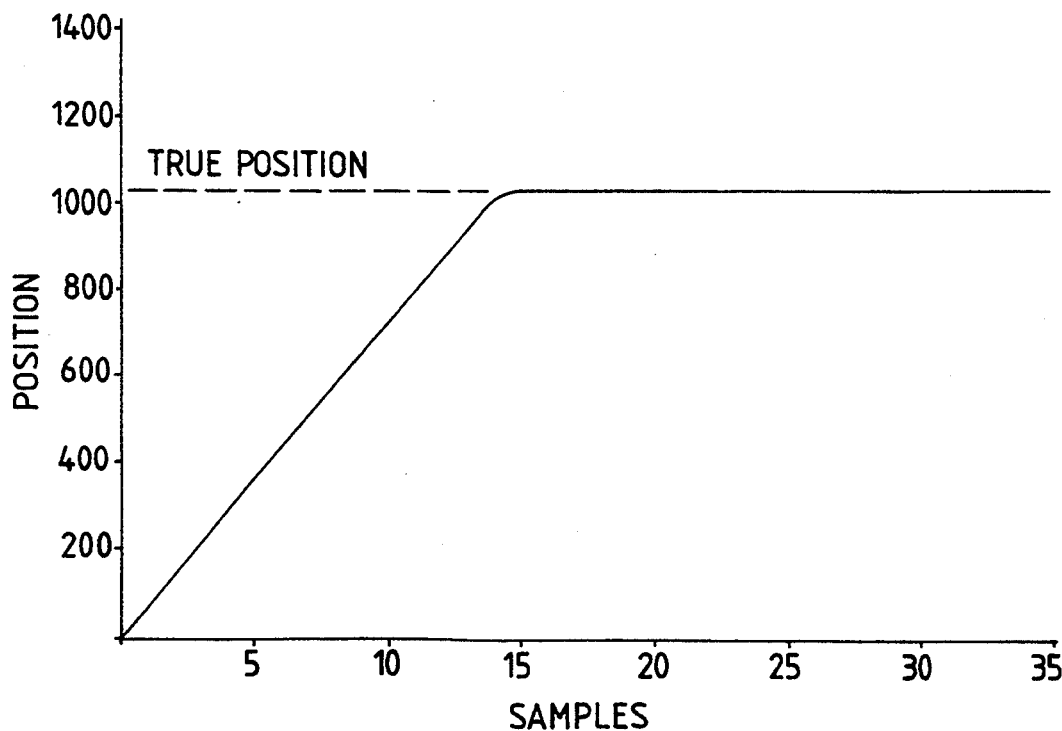
FIGS. 4-6 show simulations of a sampling search for a frequency correction burst at different carrier-to-noise ratios (CNR)
Figure 5:
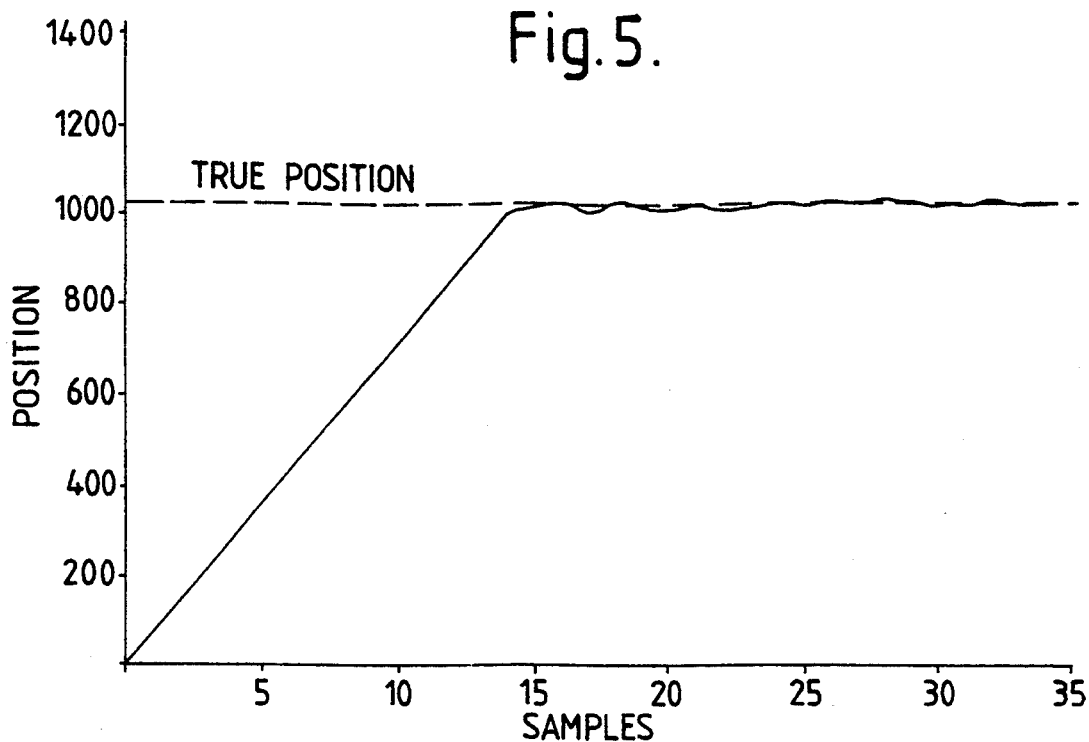
Figure 6:
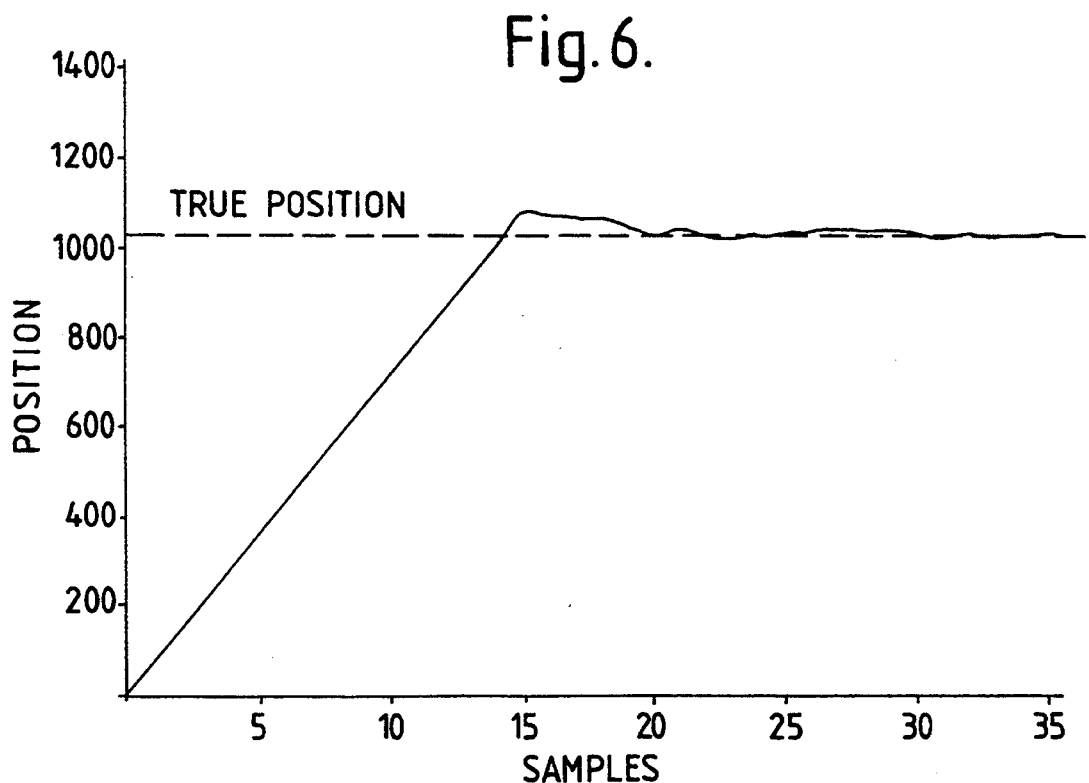

FIGS. 4, 5 and 6 show some simulation results for the algorithm above. The frequency bursts, with a randomly selected frequency in the range ±20 kHz, extend from point 1028 to 1170 in time in a sequence of 1420 consecutive samples and is surrounded by random data which has been passed through a GMSK modulator to give it the correct spectrum characteristics. Uncorrelated channel noise is added to both data and frequency burst. There are no amplitude gaps between the random data and the frequency burst.

The program searches consecutively from the beginning with blocks of size 72 at the original sampling rate (reduced to 47) and a threshold of 2500. Once detection is achieved the phase-lock loop operation begins and in FIG. 4 at 10 dB CNR the delay is held with an accuracy of ±1 samples. In FIG. 5 the CNR is 0 db and more randomness in the loop is apparent, though still well within usable limits, while in FIG. 6 the CNR is −5 dB and the PLL takes several blocks to settle.

Reference was made above to the limiting accuracy of the frequency estimator being proportional to the cube of the number of sample points. The opportunity can be taken to correct the frequency of the LO at the same time as the timing is found. Frequency correction can start as soon as the first detection of the burst occurs. This will give a sequence of correction steps to the LO which should bring it fairly close to the required accuracy (0.05 ppm) but probably not with sufficient reliability that this method could be used exclusively. However the closer the LO is to the correct frequency the simpler it is to fine tune it. The frequency accuracy attainable during block search appears to be on the order of 1 kHz (limited by the small DFT's used) which is 20 times better than the unaided oscillator specification. More significantly, a phase lock loop with a 1 kHz bandwidth would lock in rapidly and its time constants would approximate the duration of the frequency burst. Thus it is quite possible that a digital phase lock loop operating on the digitised IF would synchronise the LO within the 100 Hz accuracy required within the duration of one or two frequency bursts.

The invention thus provides a robust method of searching for the frequency correction bursts. The search has two phases and the first involves 64-point DFT's on 71-bit sliding blocks of data to get a coarse estimate of the location, the second uses a phase-lock loop to get a fine estimate of timing. First detection time of the frequency burst is inversely proportional to computation power assigned to the task but at minimum, with a DFT every 46 ms, the bursts would be located within 19 frequency bursts, or 1 second, on the assumption that the broadcast channel frequency is known a-priori. This time would be reduced pro-rata if faster DFT's are possible; the minimum possible search time would be 92 ms if the DFT's could be done in 4.6 ms.

The second phase uses a feedback loop in phase lock loop fashion to finely adjust the timing estimate. At 10 dB CNR this takes only a few blocks to settle, corresponding to perhaps 200 ms, in real time.

A further refinement is that the VCO in the handset can also be adjusted during the second stage search as a side operation and the frequency would be corrected to within 1 kHz. This would allow a digital phase lock loop to take over and reduce the error to the required 100 Hz with only one or two further frequency bursts.

Figure 7:
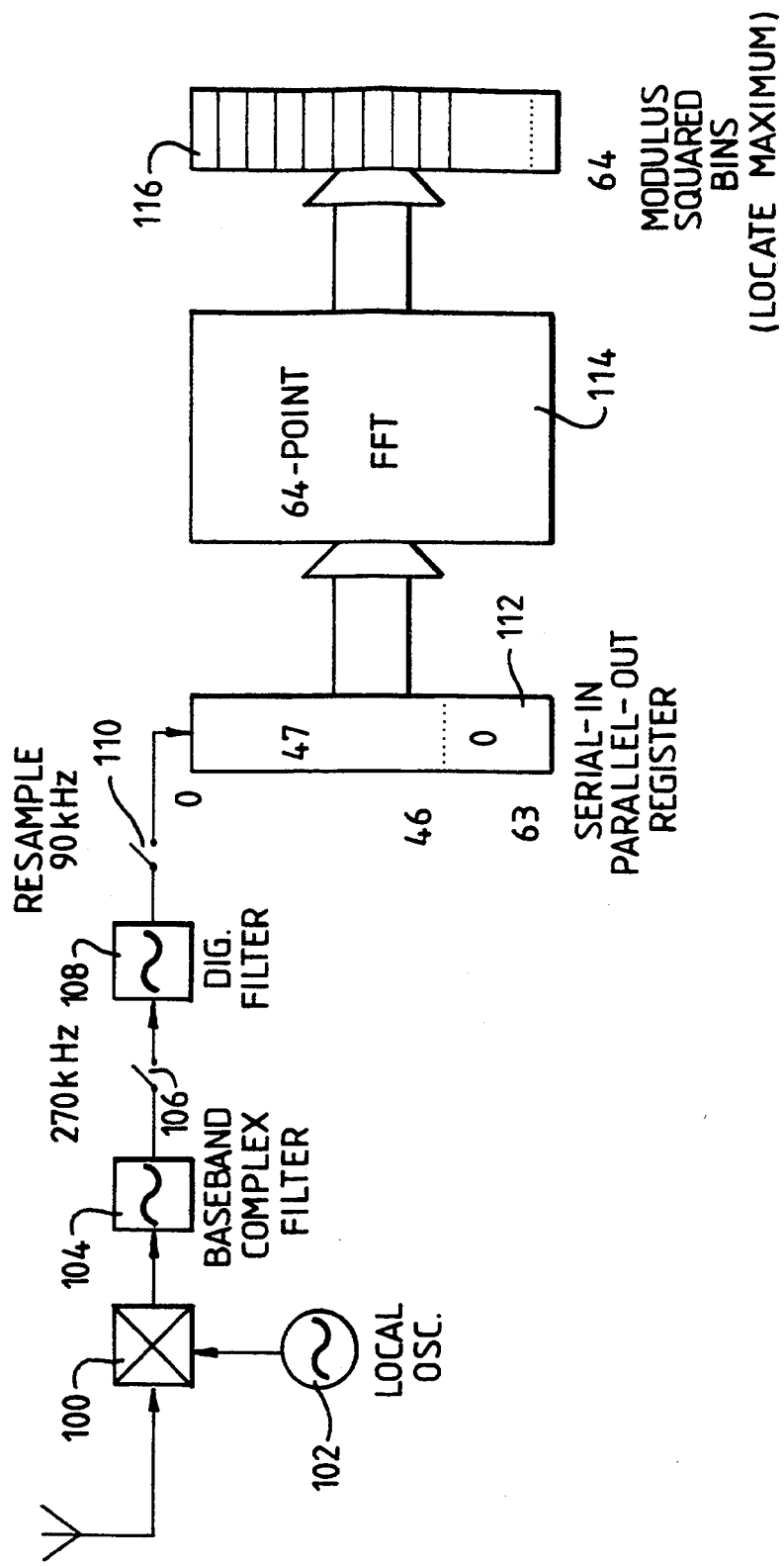
FIG. 7 shows an implementation for a frequency burst acquisition apparatus.

In the implementation shown in FIG. 7 the received r.f. signals are first fed to a multiplier 100 together with the signal from a local oscillator 102 to effect down conversion of the r.f. signals to baseband. The output of multiplier 100 is then passed through a baseband complex filter 104 to a first sampling circuit 106 where the filtered baseband signals are sampled at a rate of 270 kHz. The sampled signals are filtered in a digital filter 108 and re-sampled in a second sampling circuit 110 at a sampling rate of 90 kHz. The re-sampled signals are loaded serially, 47 samples at a time, into a serial-to-parallel buffer register 112. The register is in fact a 64-bit register, the balance of the register being permanently loaded with zeros to make up the full 64 bits required for the following FFT. The contents of the buffer register 112 are fed out in parallel to the 64-point Fast Fourier Transform network 114. The FFT output provides 64 outputs in parallel which go into 64 "bins" 116 each representing the medullas square power level of the signal at a different frequency. The process is repeated for successive blocks of samples until one of the bins having a maximum value exceeding the predetermined threshold is located. This effects a first, coarse acquisition of a frequency burst in the received r.f. This completes the first phase of the acquisition process. Using conventional phase lock loop techniques, the process is repeated on an adjacent or other specified block of samples. As described earlier, when two adjacent blocks are located, each having a power level exceeding the threshold level at the same frequency, then the frequency burst is properly located.

I claim:

1. A method of acquiring frequency bursts in a personal communication network (PCN) broadcast control channel including the steps of:
   i) sampling PCN radio frequency (r.f.) signals for successive blocks of time of duration of half the duration of a frequency burst;
   ii) determining the first block to have a spectrum level to exceed a threshold value,
   iii) comparing the spectrum levels of said first block and an adjacent block during successive occurrences of the frequency burst; and
   iv) adjusting the timing of the two blocks until the spectrum levels of the two blocks are substantially equal.

2. A method of acquiring frequency bursts in a personal communication network (PCN) broadcast control channel, including the steps of:
   i) sampling at a first rate a group of channels having different known frequencies for successive blocks of time of a duration of half the duration of a frequency burst;
   ii) performing a digital discrete Fourier transform (DFT) filter operation on the signal samples in each block;
   iii) comparing the peak spectrum level of each DFT filtered sample with a predetermined threshold value to determine the first block to have a spectrum level to exceed the threshold value;
   iv) comparing the spectrum levels of said first block and an adjacent block repetitively substantially on successive occurrences of the frequency burst to derive a differential of the spectrum levels;
   v) generating an error signal representing the differential of the spectrum levels; and
   (vi) applying said error signal in a feedback loop to adjust the sampling times of said first and adjacent blocks to drive the differential of the spectrum levels to zero.

3. A method according to claim 2 further including the steps of initially down converting the PCN r.f. signals to baseband, performing a first sampling of the baseband signals at a second rate higher than said first rate and digitally filtering said sampled baseband signals prior to performing said sampling at said first rate.

* * * * *